(12) United States Patent
Arnold et al.

(10) Patent No.: US 6,419,212 B1
(45) Date of Patent: Jul. 16, 2002

(54) MODULAR SPRING FOR A MATTRESS FOUNDATION UNIT

(75) Inventors: Wayne Arnold, Farramere; Graham Colman, Morningside; Gianni Nosenzo, St. Andrews, all of (ZA)

(73) Assignee: International Wire Convertors (Pty) Ltd., Gauteng (ZA)

( * ) Notice: Subject to any disclaimer, the term of this patent is extended or adjusted under 35 U.S.C. 154(b) by 0 days.

(21) Appl. No.: 09/977,037

(22) Filed: Oct. 12, 2001

(51) Int. Cl.[7] .................................................. F16F 3/00
(52) U.S. Cl. .......................................... 267/103; 5/247
(58) Field of Search .......................... 267/91, 95, 103, 267/106, 107; 5/297, 249, 255, 476

(56) References Cited

U.S. PATENT DOCUMENTS

| | | | |
|---|---|---|---|
| 4,862,531 A | | 9/1989 | Wells |
| 4,862,532 A | | 9/1989 | Wells et al. |
| 4,896,386 A | * | 1/1990 | Ogle et al. ............. 5/247 |
| 5,142,715 A | * | 9/1992 | Ogle et al. ............. 5/247 |
| 5,152,509 A | * | 10/1992 | Wells et al. ............. 267/103 |
| 5,176,367 A | * | 1/1993 | Rodgers et al. ............. 267/103 |
| 5,346,188 A | * | 9/1994 | Rodgers et al. ............. 267/106 |
| 5,401,007 A | * | 3/1995 | Dabney et al. ............. 267/103 |
| 5,704,595 A | * | 1/1998 | Kitchen et al. ............. 267/103 |
| 5,967,499 A | | 10/1999 | McCraw |
| 6,272,700 B1 | * | 8/2001 | Wickstrom ............. 5/239 |

* cited by examiner

Primary Examiner—Christopher P. Schwartz
(74) Attorney, Agent, or Firm—Wood, Phillips, Katz, Clark & Mortimer

(57) ABSTRACT

The invention relates to a modular spring for a mattress foundation unit having a wooden base a plurality of modular springs and a mattress supporting wire grid that is supported above the wooden base by the modular springs. The modular spring comprises a planar top portion which can be attached to the wire grid, four straight legs and each leg terminating in a transverse foot portion. The top portion includes four partially curved spaced apart members. The legs extend downwardly from the top portion in an obtuse angular relation to the top portion and each leg interlinks two adjacent partially curved members.

11 Claims, 4 Drawing Sheets

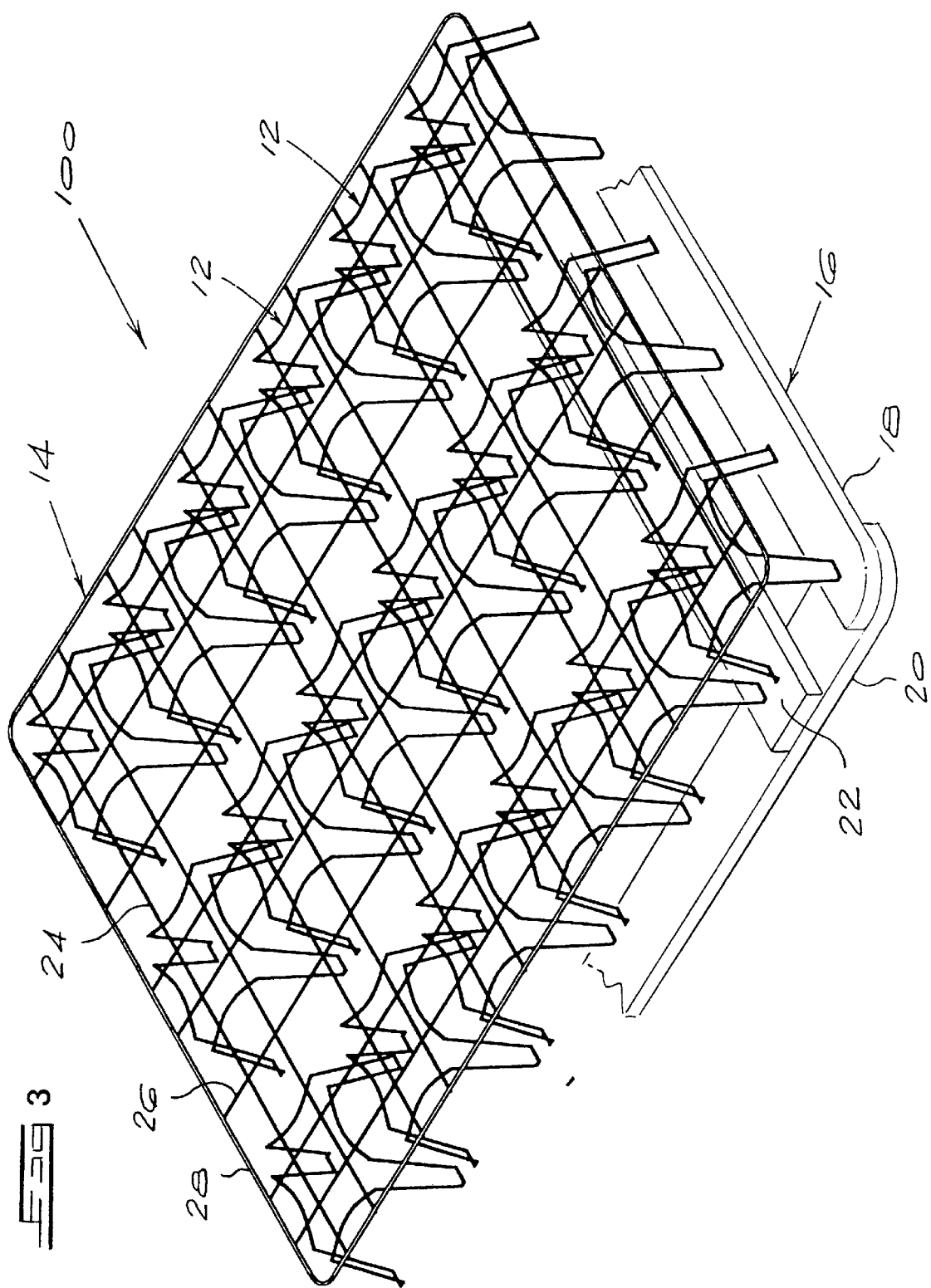

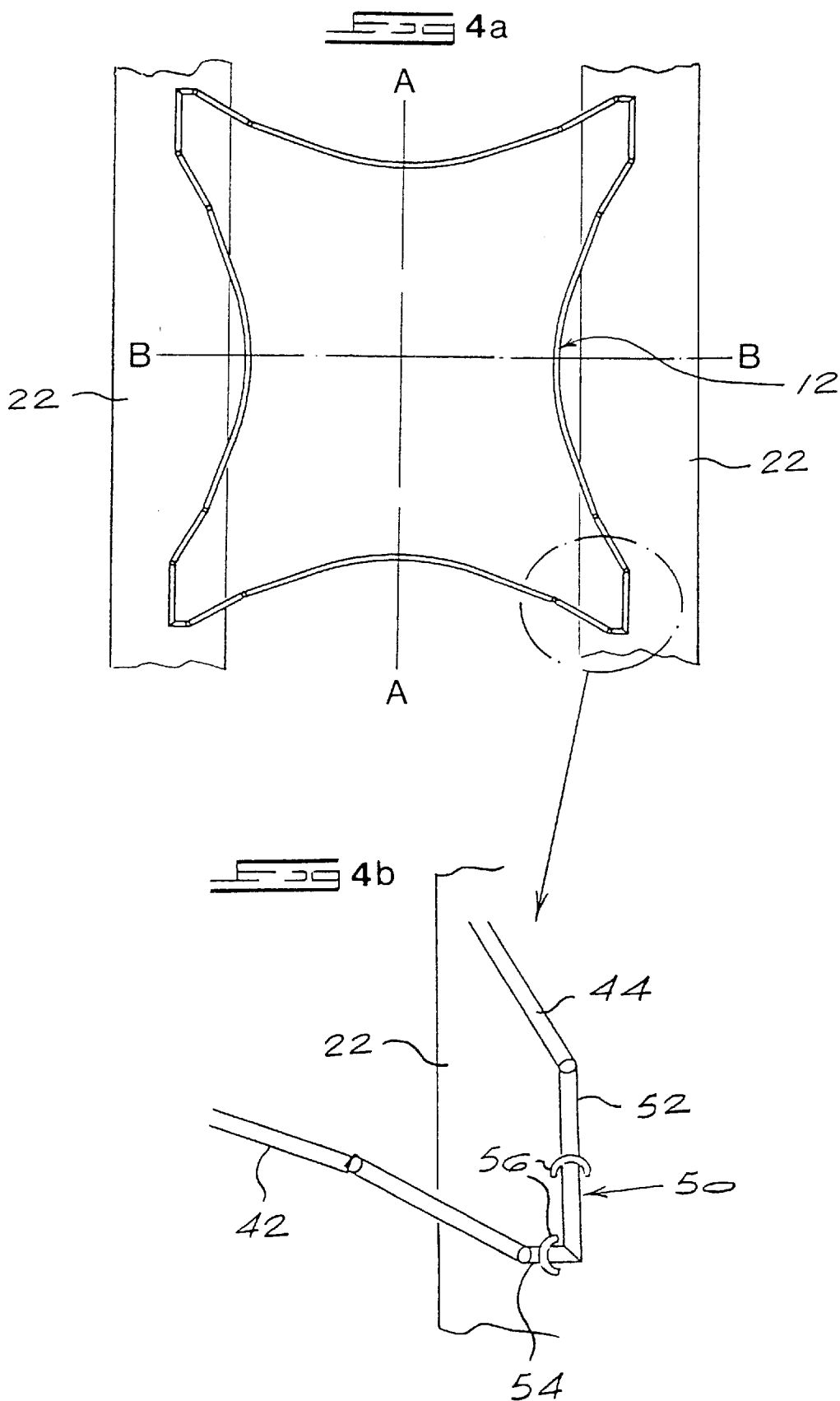

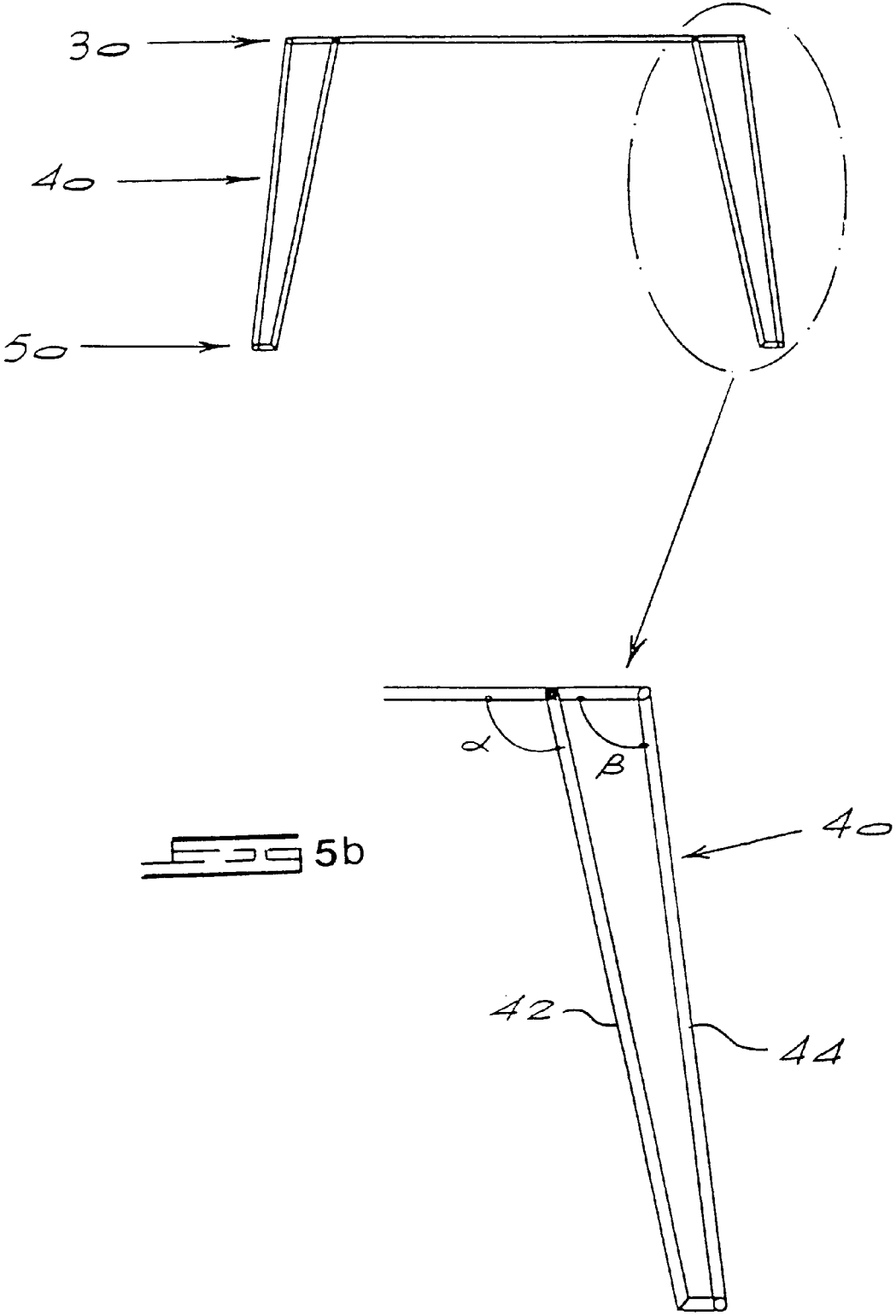
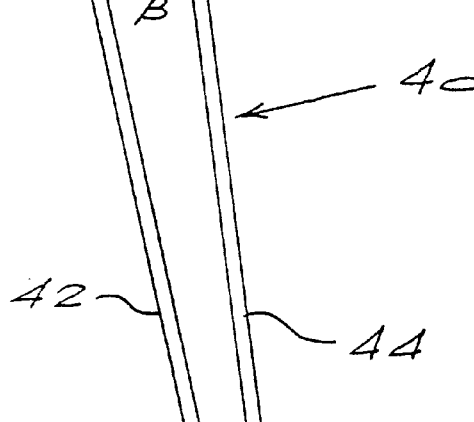

MODULAR SPRING FOR A MATTRESS FOUNDATION UNIT

BACKGROUND TO THE INVENTION

THIS invention relates to a modular spring for a mattress foundation unit.

"Modular spring" is a term of art used to describe a spring which derive its resiliency from configurations other than coils.

A conventional mattress foundation unit, sometimes referred to as a "box spring", generally includes a wooden base frame, modular springs and a mattress supporting wire grid that is supported above the wooden base frame by the modular springs. The modular springs are normally stapled to the wooden base frame below.

In some instances the top section of the modular spring is welded to the wire grid. One such configuration is disclosed in U.S. Pat. No. 5,967,499, wherein the top section includes two straight wire portions lying in angularly converging mirror image relation to each other. Another feature of the configuration is that four straight legs extend between the top section and the bottom section, with two of the legs extending in a first support plane from the top to the bottom section in angularly converging mirror image relation to one another, while one of the other two legs extends from the top section to the bottom section towards the first support plane. Often, the wire grid and spring modules are manufactured and pre-assembled by a first manufacturer before being transported to a second manufacturer. The second manufacturer will typically complete the final mattress foundation unit by connecting the pre-assembly to the wooden base frame and applying the padding and covering. The ease of assembly and stackability of the pre-assembly are important design criteria for the first manufacturer.

SUMMARY OF THE INVENTION

According to the invention there is provided a modular spring for a mattress foundation unit having a wire grid, a rigid base and a plurality of modular springs extending between the wire grid and the rigid base, each modular spring including:

- a generally planar top portion connectable to the wire grid, the top portion including four partially curved, spaced apart members;
- four legs extending downwardly from the top portion in an obtuse angular relation to the top portion and in diverging relation to each other, each leg interlinking two adjacent, partially curved members, and each leg terminating in a transverse foot portion, the foot portions being co-planar with one another and being connectable to the rigid base.

Typically, the top portions of the modular springs are welded to the wire grid.

In a preferred embodiment of the invention, each leg comprises two substantially straight spring members. Typically, the straight spring members are spaced apart and non-coplanar with one another.

Normally, the four partially curved members are spaced apart in a generally rectangular orientation.

Advantageously, the modular spring is symmetrical about planes that bisect opposing partially curved members.

Another aspect of the invention provides a stackable pro-assembly for a mattress foundation unit having a rigid base, the stackable pre-assembly including:

- a generally planar wire grid including a plurality of grid wires arranged in a crisscross pattern;
- a plurality of modular springs connected to the wire grid, each modular spring including:
  - a generally planar top portion connectable to the wire grid, the top portion including four partially curved, spaced apart members;
  - four legs extending downwardly from the top portion in an obtuse angular relation to the top portion and in diverging relation to each other, each leg interlinking two adjacent, partially curved members, and each leg terminating in a transverse foot portion, the foot portions being co-planar with one another and being connectable to the rigid base.

BRIEF DESCRIPTION OF THE DRAWINGS

The invention will now be described in more detail, by way of example only, with reference to the accompanying drawings in which:

FIG. 3 shows a perspective view of the modular spring and wire grid pre-assembly attached to a wooden base;

FIG. 4a shows a top view of the modular spring illustrated in FIG. 1;

FIG. 4b shows an enlarged view of a foot portion of the modular spring illustrated in FIG. 4a;

FIG. 5a shows a side view of the modular spring illustrated in FIG. 1; and

FIG. 5b shows an enlarged view of a leg of the modular spring illustrated in FIG. 5a;

DESCRIPTION OF AN EMBODIMENT

Figure 2:
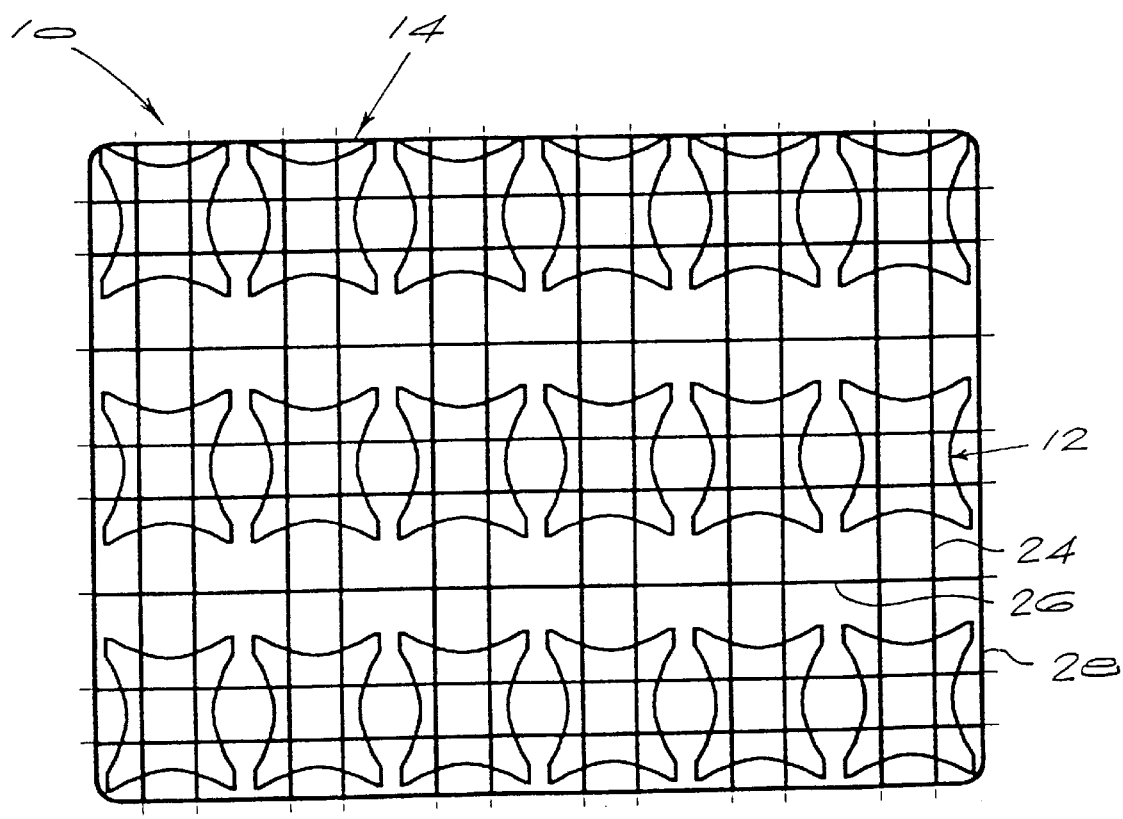
FIG. 2 shows a top view of the modular spring and a wire grid pre-assembly.

The pre-assembly 10 seen in FIG. 2 includes an array of modular springs 12 connected to an upper wire grid 14. The pre-assembly is connected to a rigid bottom base 16 to form a mattress foundation unit 100 as illustrated in FIG. 3.

The wire grid 14 comprises a border wire 28 and a first plurality of spaced, parallel grid wires 24 that orthogonally intersects a second plurality of spaced, parallel grid wires 26. The grid wires are welded to the border wire at their outer ends and the first plurality grid wires 24 and the second plurality of grid wires 26 are welded together at the intersections to form the welded wire grid 14.

The conventional rigid bottom base 16 partially illustrated in FIG. 3, consists of a wooden frame that is assembled from side slats 20, end slats 18 and spaced cross slats 22 extending between the side slats.

Figure 1:
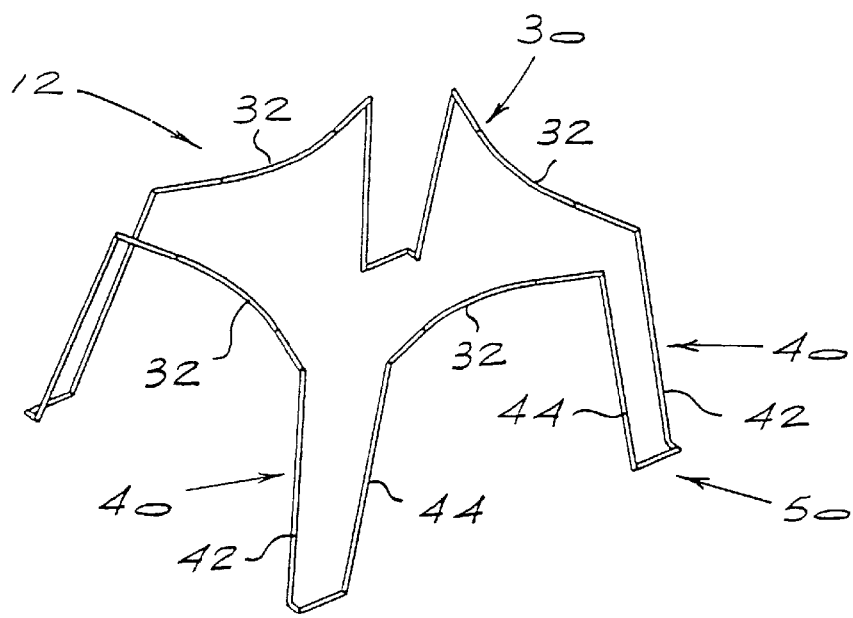
FIG. 1 shows a perspective view of a modular spring according to the present invention.

The modular spring 12 shown in FIG. 1 is made of spring steel wire and includes a top portion 30 and four legs 40 extending downwardly from the top portion 30. Each of the legs 40 terminated in a foot portion 50. FIG. 4a shows that the modular spring is symmetrical about planes A—A and B—B.

The top portion 30 comprises four partially curved sections 32. The partially curved sections 32 are essentially concave, spaced apart and coplanar with one another.

A downwardly extending leg 40 interlinks adjacent partially curved sections 32. The legs 40 extend outwardly and are divergent with respect to one another. Each leg 40 includes two predominantly straight spring members 42 and 44 that are non-coplanar with one another. As shown in FIG. 5b, the straight spring member 42 extends outwardly at an obtuse angle α relative to the top portion plane, while the straight spring member 44 extends outwardly at a slightly smaller obtuse angle β relative to the top portion plane.

Each leg terminates in a transverse, generally L-shaped foot portion 50. As illustrated in FIG. 4b, each L-shaped foot portion has two co-planar limbs 52 and 54 that are both connectable to the cross slat 22 by staples 56. The limb 52 is longer than the limb 54 and the limbs are generally perpendicularly oriented with one another.

The modular springs and wire grid are normally attached to form a pre-assembly before being connected to the rigid bottom base. The modular springs are attached to the wire grid by welding the top sections 30 to the wire grid. The modular springs are generally arranged in parallel rows extending in mutually orthogonal direction. It will be appreciated that if a preassembled is stacked on top of another pre-assembly, then the legs 40 of the modular springs attached to the top pre-assembly will easily slide in the legs 40 of the modular springs attached to the pre-assembly below. This feature allows a plurality of preassemblies to be nestably stackable on top of one another.

In order to assemble the mattress foundation unit, the pre-assembly is stapled to the rigid bottom base 16 before applying the padding and covering. Except for the unique spring pre-assembly, the mattress foundation unit is conventional and the complete unit is not illustrated in any figure.

We claim:

1. A modular spring for a mattress foundation unit having a wire grid, a rigid base and a plurality of modular springs extending between the wire grid and the rigid base, each modular spring including:
   a generally planar top portion connectable to the wire grid, the top portion including four partially curved, spaced apart members; and
   four legs extending downwardly from the top portion in an obtuse angular relation to the top portion and in diverging relation to each other, each leg interlinking two adjacent, partially curved members, and each leg terminating in a transverse foot portion, the foot portions being co-planar with one another and being connectable to the rigid base.

2. A modular spring according to claim 1, wherein each leg comprises two substantially straight spring members.

3. A modular spring according to claim 2, wherein the straight spring members are spaced apart and non-coplanar with one another.

4. A modular spring according to claim 1, wherein the four partially curved members are spaced apart in a generally rectangular orientation.

5. A modular spring according to claim 4, wherein the modular spring is symmetrical about planes that bisect opposing partially curved members.

6. A stackable pre-assembly for a mattress foundation unit having a rigid base, the stackable pre-assembly including:
   a generally planar wire grid including a plurality of grid wires arranged in a crisscross pattern;
   a plurality of modular springs connected to the wire grid, each modular spring including:
      a generally planar top portion connectable to the wire grid, the top portion including four partially curved, spaced apart members; and
      four legs extending downwardly from the top portion in an obtuse angular relation to the top portion and in diverging relation to each other, each leg interlinking two adjacent, partially curved members, and each leg terminating in a transverse foot portion, the foot portions being co-planar with one another and being connectable to the rigid base.

7. A stackable pre-assembly according to claim 6, wherein the top portions of the modular springs are welded to the wire grid.

8. A stackable pre-assembly according to claim 6, wherein each leg comprises two substantially straight spring members.

9. A stackable pre-assembly according to claim 8, wherein the straight spring members are spaced apart and non-coplanar with one another.

10. A stackable pre-assembly according to claim 6, wherein the four partially curved members are spaced apart in a generally rectangular orientation.

11. A stackable pre-assembly according to claim 10, wherein the modular spring is symmetrical about planes that bisect opposing partially curved members.

* * * * *